INVENTOR.
ALFRED BRÄTH
BY
Michael S. Striker
Atty

Oct. 15, 1968 A. BRAETH 3,405,945

SOUND RECORDING AND REPRODUCING APPARATUS

Filed Oct. 6, 1966 2 Sheets-Sheet 2

INVENTOR.

ALFRED BRATH

BY

Michael S. Striker

Atty

United States Patent Office 3,405,945
Patented Oct. 15, 1968

3,405,945

SOUND RECORDING AND REPRODUCING APPARATUS

Alfred Braeth, Unterhaching, Germany, assignor to Agfa-Gevaert Aktiengesellschaft, Leverkusen, Germany Filed Oct. 6, 1966, Ser. No. 584,707
Claims priority, application Germany, Oct. 13, 1965, A 50,476
17 Claims. (Cl. 274—4)

Figure 1:
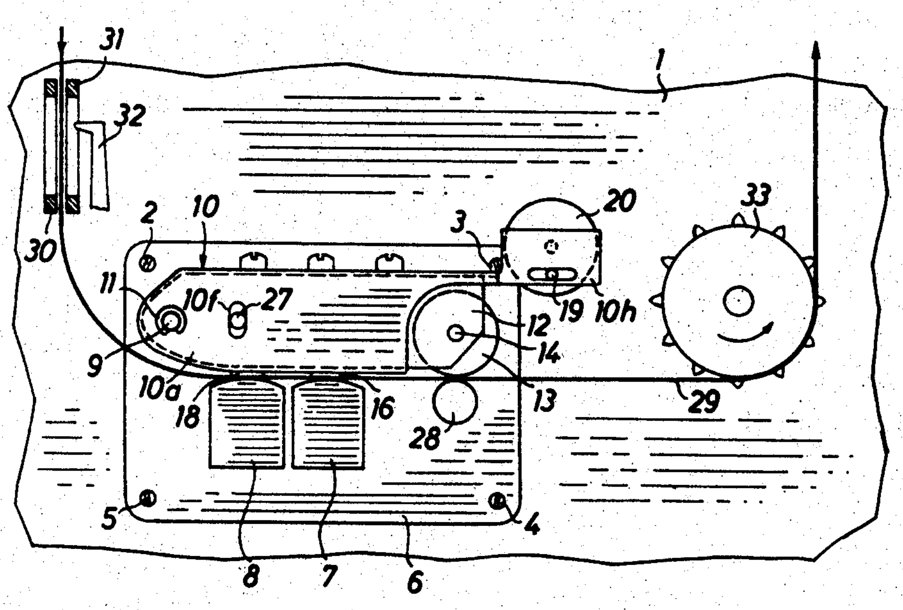

The present invention relates to magnetic sound recording and/or reproducing apparatus. More particularly, the invention relates to improvements in magnetic apparatus for reproducing or recording sound on a photosensitive carrier, such as movie film with one or two sound tracks.

In many presently known sound recording or reproducing apparatus which utilize a photosensitive sound carrier, the sound head or heads must be installed 54 or 56 frames before the film gate. Serious problems arise in such conventional apparatus if the distance between the sound head or heads and the film gate is reduced to 18 frames, this reduced distance being desirable in many recent types of magnetic recording and reproducing apparatus. Also, conventional apparatus of such character must be constructed and assembled with a high degree of precision; otherwise, minor inaccuracies in machining or mounting add up and affect the position of the sound carrier with reference to the heads.

Accordingly, it is an important object of the present invention to provide a sound-on-film movie camera or an analogous magnetic sound recording and/or reproducing apparatus wherein the sound system can be accommodated in a small area and wherein the components of the sound system can be produced and assembled at a low cost without affecting the quality of sound recording or reproduction.

Another object of the invention is to provide an apparatus of the just outlined characteristics wherein the members which press the sound carrier against the sound heads and/or against the capstan of the sound system are mounted with such freedom or movement that they can readily compensate for inaccuracies in the thickness of the sound carrier.

A further object of the invention is to provide an apparatus wherein the bias of members which urge the sound carrier against the heads and capstan of the sound system can be adjusted with little loss in time and without necessitating even partial dismantling of the sound system.

An additional object of the invention is to provide a very simple and compact actuating device which can move the pressing members for the sound carrier between operative and retracted positions to facilitate convenient threading of the sound carrier and rapid rewinding onto the supply spool.

Still another object of the invention is to provide an improved sound recording or reproducing apparatus of the above outlined characteristics wherein the distance between the sound head or heads and the film gate need not exceed 18 film frames.

A concomitant object of the invention is to provide a sound system wherein the more sensitive parts are at least partially concealed by less sensitive parts to prevent damage or contamination.

A further object of the invention is to provide a novel advancing mechanism for the sound carrier of a magnetic sound recording and/or reproducing apparatus.

Briefly stated, one feature of my invention resides in the provision of a sound-on-film camera or an analogous magnetic sound recording and/or reproducing apparatus which may be used to reproduce and/or record sound on at least one sound track provided on movie film or a like sound carrier. The apparatus comprises a support, advancing means provided on the support for moving the sound carrier along a predetermined path, a sound head and a capstan adjacent to one side of the path and mounted on the support, a spindle mounted on the support at the other side of the path, a plurality of holders turnably mounted on the spindle with limited freedom of angular movement with reference to each other, a first pressing member provided on one of the holders and arranged to urge the sound carrier against the sound head, a second pressing member provided on another holder and arranged to urge the sound carrier against the capstan, and actuating means for moving the holders between a first or operative position in which the pressing members engage the sound carrier and a second or inoperative position in which the pressing members are spaced from the sound carrier in the path.

The holders preferably resemble U-shaped bodies whose flanges are turnably mounted on the spindle and which are received one within the other so that the remaining holders are accommodated within the confines of the outermost holder which latter is operatively connected with the actuating means. Such boxing of holders into each other results in an exceptionally compact design and the tolerances in construction of individual holders and their pressing members cannot be added up and cannot adversely affect the guidance of sound carrier along the sound head and capstan. It was found that the improved apparatus will operate properly even if the individual holders are not finished and/or mounted with utmost precision.

Figure 2:
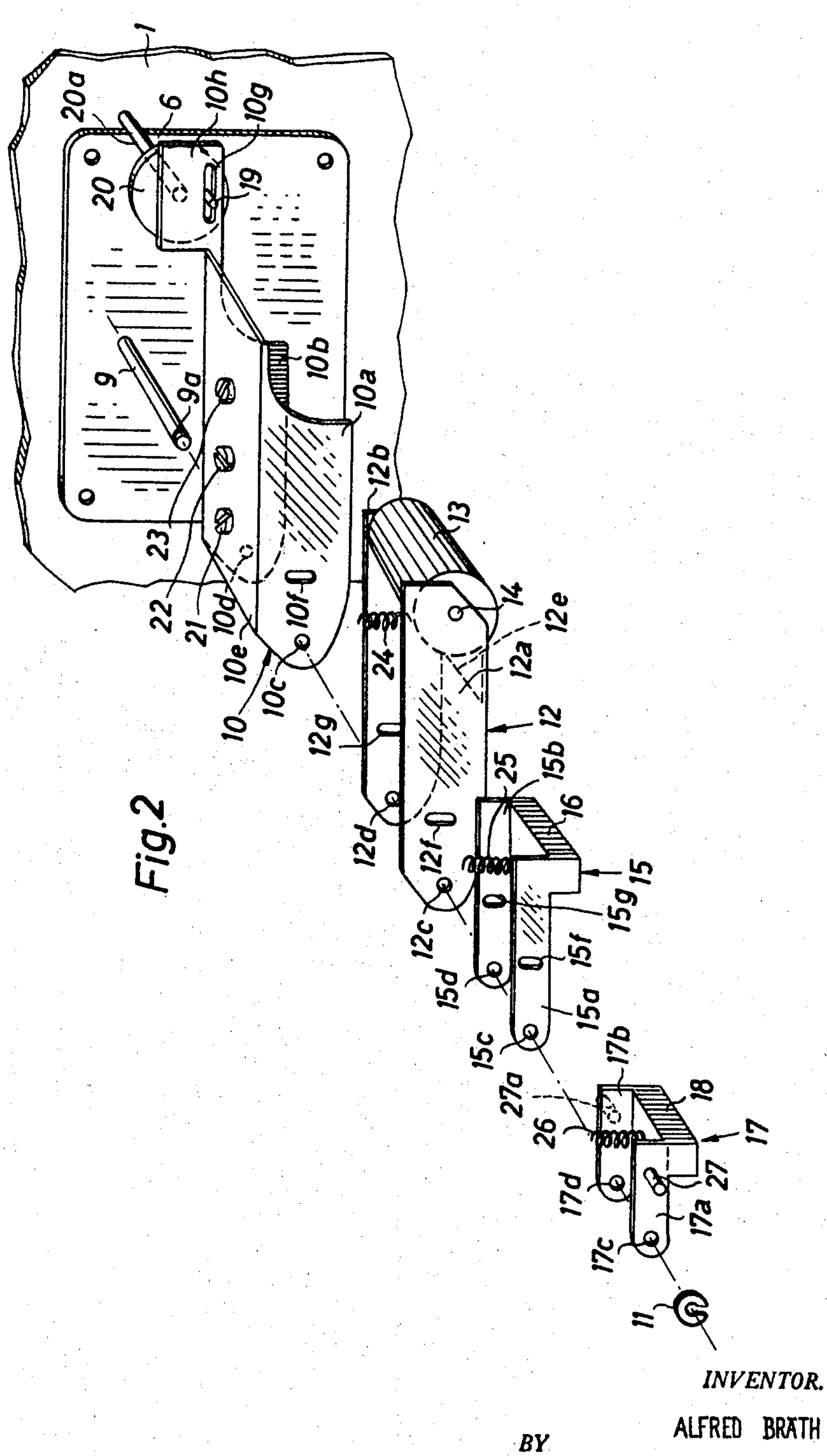

The novel features which are considered as characteristic of the invention are set forth in particular in the appended claims. The improved apparatus itself, however, both as to its construction and its mode of operation, together with additional features and advantages thereof, will be best understood upon persual of the following detailed description of a specific embodiment with reference to the accompanying drawings, in which:

FIG. 1 is a fragmentary plan view of a sound recording and reproducing apparatus which embodies my invention; and FIG. 2 is an exploded perspective view of the structure shown in FIG. 1.

FIG. 1 shows a portion of a sound recording and reproducing apparatus which uses a photosensitive sound carrier, e.g., a movie film 29 having one or more sound tracks running along one or both edges of the back of the film. The apparatus may constitute a tape recorder and comprises a support including a plate or base 1 and a platform 6 which is secured to the base by screws 2, 3, 4, and 5. The platform 6 carries a sound recording and reproducing head 7 and an erasing head 8, both adjacent to one side of the film path. A spindle 9 is riveted or otherwise secured to the platform 6 at the other side of the film path and supports a rockable U-shaped holder 10 which is retained thereon by a split ring 11.

As shown in FIG. 2, the flanges or arms **10*a*, 10*b* of the holder 10 are provided with registering openings 10*c*, 10*d* for the spindle 9 and can straddle the flanges or arms 12*a*, 12*b* or a second U-shaped holder 12. The flanges 12*a*, 12*b* are respectively provided with registering openings 12*c*, 12*d* for the spindle 9. The web of the holder 12 is constituted by a pressing member here shown as an idler roller 13 whose shaft 14 is journalled in the flanges 12*a*, 12*b*. The roller 13 cooperates with a capstan 28 which is mounted on the platform 6** at the one side of the film path.

A third rockable U-shaped holder 15 has a web 16 constituting a friction pad and serving as a pressing member to urge the film 29 against the sound head 7. The two flanges or arms **15*a*, 15*b* of the holder 15 are provided with registering openings 15***c*, 15*d* for the spindle 9, and the friction pad 16 is biased in a clockwise direction by a resilient element here shown as a helical expansion spring 25. A fourth U-shaped holder 17 also carries a web or friction pad 18 which serves as a pressing member to urge the film 29 against the erasing head 8. The flanges or arms 17*a*, 17*b* of the holder 17 are respectively provided with registering openings 17*c*, 17*d* for the spindle 9. The width of the holders 12, 15, 17 is selected in such a way that the holder 12 may be received between the flanges 10*a*, 10*b*, that the holder 15 may be received between the flanges 12*a*, 12*b*, and that the holder 17 may be received between the flanges 15*a*, 15*b*. The holders 10, 12, 15, 17 are boxed or fitted into each other prior to slipping the spindle 9 through the openings 10*d*, 12*d*, 15*d*, 17*d*, 17*c*, 15*c*, 12*c*, 10*c* in the just outlined sequence. The ring 11 is thereupon slipped into the circumferential groove 9*a* of the spindle 9 to fix the holders 10, 12, 15 against axial movement.

The outermost holder 10 has an integral projection or lug 10*h* which is shown as being coplanar with the flange 10*b* and is provided with an elongated slot 10*g* for an eccentric crank pin 19 provided on an actuating disk 20 fixed to a shaft 20*a* which is rotatable in the base 1. The web 10*e* of the holder 10 overlies the holders 12, 15, 17 and is provided with tapped bores each of which takes one of three adjusting screws 21, 22, 23. The stem of the screw 23 serves as a retainer for one end portion of a helical expansion spring 24 the other end of which is fastened to a plate-like retainer 12*e* extending between the flanges 12*a*, 12*b* of the holder 12. The screw 22 performs the same function in connection with one end portion of the aforementioned helical expansion spring 25 for the friction pad 16 of the holder 15. The screw 21 retains one end portion of a helical expansion spring 26 for the friction pad 18 of the innermost holder 17. By the simple expedient of rotating the screws 21, 22, 23 with reference to the web 10*e* of the outermost holder 10, the operator can change the bias of the springs 24, 25, 26 without necessitating even partial dismantling of the apparatus.

The flange 17*a* of the innermost holder 17 is provided with an outwardly extending coupling member here shown as a pin or stud 27 which is received with clearance in elongated slots 15*f*, 12*f*, 10*f* respectively provided in the flanges 15*a*, 12*a* and 10*a*. If the actuating disk 20 is moved to the dead center position shown in FIG. 1 or 2, the crank pin 19 moves the holder 10 in a clockwise direction whereby the springs 24–26 cause the idler roller 13 to bear against the film 29 opposite the capstan 28 and the friction pads 16, 18 to bear against the film 29 opposite the heads 7 and 8. The holder 10 is then held against vibratory movement because it is fixed by the crank pin 19. However, the remaining holders 12, 15, 17 can oscillate about the spindle 9 with limited freedom of angular movement determined by the length of slots 10*f*, 12*f*, 15*f*. Such oscillatory movements are desirable to compensate for uneven thickness of the film 29 and for certain other reasons.

If the shaft 20*a* of the actuating disk 20 is thereupon rotated to move the disk to a second dead center position (not shown in the drawings), the crank pin 19 rocks the holder 10 in a counterclockwise direction and to such a level that the film 29 is free to travel along the heads 7, 8 and capstan 28 without even touching the idler roller 13 and friction pads 16, 18. The coupling pin 27 is then in abutment with the surface bounding the lower ends of the slots 10*f*, 12*f*, 15*f*. If desired, the flange 17*b* of the holder 17 may be provided with a second outwardly extending coupling pin 27*a* which is received in elongated slots 12*g*, 15*g* of the flanges 12*b*, 15*b*.

FIG. 1 further shows a film gate comprising two frames 30, 31, and a claw 32 of the film advancing mechanism.

When the user wishes to make an exposure, the film 29 will travel from a supply reel (not shown), between the frames 30, 31 of the film gate, between the heads 8, 7 and friction pads 18, 16, between the capstan 28 and roller 13 about a constantly driven sprocket 33 which also forms part of the film advancing mechanism and rotates in a counterclockwise direction, and on to the core of the takeup reel (not shown). That the portion of the film path which is defined by the frames 30, 31 makes an angle of approximately 90 degrees with a straight second path portion which extends between the parts 28, 7 and 13, 16, 18. This straight second path portion is tangential to the sprocket 33. The motor of the film advancing mechanism drives the claw 32 intermittently between exposures of successive film frames in a manner well known from the art of movie cameras. Continuous rotation of the sprocket 33 is necessary to avoid jerky motion of the film 29 past the heads 7, 8 and capstan 28. The jerky or stepwise movement of film 29 along the film gate cannot propagate itself to the region where the film is pulled by sprocket 33 past the heads 7, 8 and capstan 28 even though the sound system is without brakes which are needed in conventional apparatus.

What is claimed as new and desired to be protected by Letters Patent is:

1. In a sound reproducing and/or recording apparatus, particularly for reproducing and/or recording sound on at least one track provided on movie film or a like sound carrier, a support; advancing means provided on said support for moving the sound carrier along a predetermined path; a sound head and a capstan adjacent to one side of said path and mounted on said support; a spindle mounted on said support at the other side of said path; a plurality of holders turnably mounted on said spindle with limited freedom of angular movement with reference to each other, each of said holders comprising a U-shaped body having a pair of flanges with at least one of said flanges being turnably mounted on said spindle, and said holders being received one within the other; a first pressing member provided on one of said holders and arranged to urge the sound carrier against said sound head; a second pressing member provided on another of said holders and arranged to urge the sound carrier against said capstan; and actuating means for moving said holders between first and second positions in which said pressing members respectively engage and are spaced from the sound carrier.

2. A structure as set forth in claim 1, wherein said holders include a third holder which is operatively connected with said actuating means.

3. A structure as set forth in claim 1, further comprising an erasing head mounted on said support adjacent to said one side of said path, said holders including a third holder and a third pressing member provided on said third holder and arranged to urge the sound carrier against said erasing head in the first position of said actuating means.

4. A structure as set forth in claim 1, wherein one of said holders is provided with an elongated slot and said actuating means comprises a disk turnable about a fixed axis and an eccentric crank pin carried by said disk and extending into said slot.

5. A structure as set forth in claim 1, wherein said holders include a third holder which accommodates said first mentioned holders and comprises a web extending between said flanges thereof, and further comprising resilient means operating between said web and said first mentioned holders for yieldably biasing said pressing members against the sound carrier.

6. A structure as set forth in claim 5, wherein said resilient means includes a plurality of helical expansion springs.

7. A structure as set forth in claim 5, further comprising adjusting means provided on said web for regulating the bias of said resilient means.

8. A structure as set forth in claim 7, wherein said resilient means comprises a plurality of helical expansion springs each having an end portion adjacent to said web, said adjusting means comprising threaded members meshing with said web and each engaging one of said end portions so that the bias of such springs may be varied in response to rotation of said threaded members.

9. A structure as set forth in claim 1, wherein said first pressing member is a friction pad and said second pressing member is an idler roller.

10. A structure as set forth in claim 9, further comprising an erasing head mounted on said support at said one side of said path, said holders including a third holder provided with a second friction pad arranged to urge the sound carrier against said erasing head in the first position of said actuating means.

11. A structure as set forth in claim 10, wherein said sound head is a combined sound recording and reproducing head.

12. A structure as set forth in claim 1, wherein said holders include an outermost third holder operatively connected with said actuating means, and further comprising coupling means provided on said holders to connect the same for said limited freedom of angular movement.

13. A structure as set forth in claim 12, wherein said coupling means comprises a pin provided on a flange of one of said holders and an elongated slot provided in a flange of each other holder, said pin extending with clearance into each of said slots.

14. A structure as set forth in claim 1, further comprising a film gate defining a first portion of said path, said path including a straight second portion extending along said sound head and said capstan and making an angle of about 90 degrees with said first portion.

15. A structure as set forth in claim 14, wherein said advancing means comprises a constantly driven sprocket arranged to continuously advance the sound carrier along said second portion of said path.

16. A structure as set forth in claim 15, wherein said second portion of said path extends substantially tangentially of said sprocket, and said advancing means further comprising a claw pull-down for moving the sound carrier stepwise along said film gate.

17. A structure as set forth in claim 1, wherein said sound head is nearer to said spindle than said capstan.

References Cited

UNITED STATES PATENTS

| | | | |
|---|---|---|---|
| 3,372,938 | 3/1968 | Hoag | 274—4 |
| 3,048,081 | 8/1962 | Biedermann et al. | 352—34 |

LEONARD FORMAN, *Primary Examiner.*

R. A. FIELDS, *Assistant Examiner.*